Mar. 27, 1923.
A. C. DE NISSON
PISTON RING
Filed Apr. 14, 1921
1,449,939
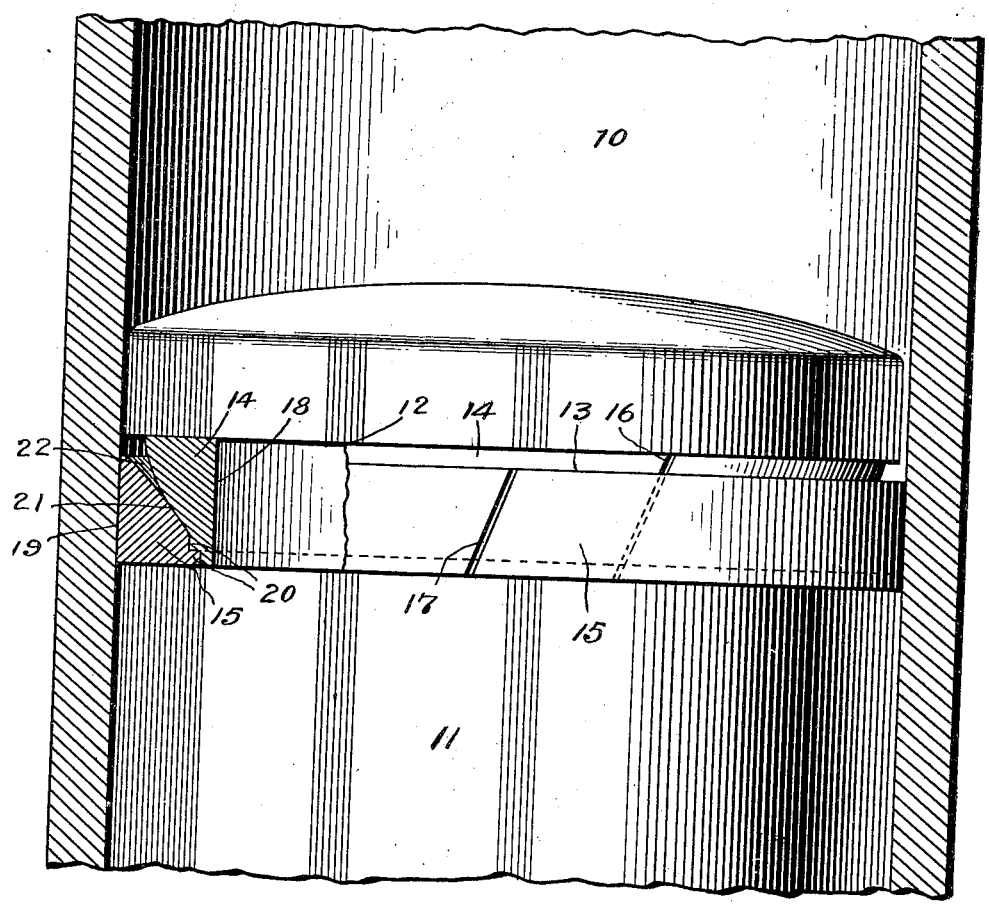
Inventor
Alfred C. DeNisson
Attorney
Frank Warren Patented Mar. 27, 1923.

1,449,939

UNITED STATES PATENT OFFICE.

ALFRED C. DE NISSON, OF SEATTLE, WASHINGTON.

PISTON RING.

Application filed April 14, 1921. Serial No. 461,248.

*To all whom it may concern:*

Be it known that I, ALFRED C. DE NISSON, a citizen of the United States, residing at Seattle, in the county of King and State of Washington, have invented a certain new and useful Improvement in Piston Rings, of which the following is a specification.

My invention relates to improvements in piston rings and the objects of my invention are to provide a piston ring comprising a male and female member whereby said male member is adapted to fit snugly within said female member at the lower portions thereof and to exert radial pressure against shoulders provided therebetween and whereby the upper portions of said members are provided with opposing convex walls which diverge from a central point to form an annular wedge-like recess into which the compressed air, caused by the piston on its upward stroke, will enter the wedge-like recess 22 and force the female member outwardly and downwardly against the walls of the cylinder and at the same time will force the male member upwardly and inwardly against the upper and side walls of the groove within the piston and when the piston has reached its topmost position the expanding air, caused by the explosion of the fluid fuel, will also enter the wedge-like recess 22 and force the female member outwardly and downwardly against the walls of the cylinder and at the same time will force the male member upwardly and inwardly against the upper and side walls of the groove within the piston, thereby forming a leak proof contact between the walls of the cylinder and the piston thereby holding the piston suspended within the cylinder chamber thus eliminating the slapping of the piston while the engine is in operation.

Other objects of my invention are to provide a piston ring which is simple and durable in construction, reliable and efficient in operation and which may be manufactured at comparatively small cost.

With the above and other objects in view which will appear as the description proceeds, the invention consists of the novel construction, adaptation, arrangement and combination of parts hereinafter described and claimed.

I accomplish these objects by devices illustrated in the accompanying drawing, which is a view in elevation of a fragmentary portion of a piston with my device installed thereon mounted within a fragmentary part of a cylinder, certain parts being shown in section.

Referring to the drawing, throughout which like reference numerals indicate like parts, the numeral 10 designates a fragmentary part of a cylinder having a fragmentary portion of a piston 11 mounted thereon.

The numeral 12 indicates the usual peripheral groove mounted in which is the piston ring 13 comprising a male member 14 and a female member 15. The usual slits 16 and 17 are respectively provided in said male and female member and are staggered in the usual manner to prevent leakage.

In cross-section it will be noted the interior wall 17 of the male member 14 is vertically disposed to conform to the upright wall of the groove 12 and that the exterior wall 19 of the female member 15 is likewise vertically disposed in parallel relation with the wall 18 to insure substantial and constant engagement with the inner wall of the cylinder 10.

The lower portions of the opposing walls of the male and female members 14 and 15 are provided with complementary step shoulders 20 whereby said male member will normally exert an outward radial pressure against said female member to insure a leak proof engagement with the walls of the cylinder 10.

The opposing peripheral walls of the male and female members 14 and 15 convexly diverge from a diagonally central point 21 to form a wedge-like recess 22 therebetween.

It will be noted that the upper and outer edge portion of the male member 14 is disposed inside of the periphery of the piston 11 and the upper and outer edge portion of the female member 15 is disposed below the upper wall of the groove 12 for the purpose of providing free access for the pressure of air to enter the wedge-like recess 22.

The compressed air, caused by the piston on its upward stroke, will enter the wedge-like recess 22 and force the female member outwardly against the walls of the cylinder and when the piston has reached its topmost position the expanding air, caused by the explosion of the fluid fuel, will also enter the wedge-like recess 22 and force the female member outwardly against the walls of the cylinder thereby forming a leak proof contact between the walls of the cylinder and the piston while the engine is in operation.

It will be obvious that the lubricating oil will collectively enter the recess 22 on the upward stroke of the piston 11 and the oil will be evenly distributed over the walls of the cylinder on the downward stroke.

As the contacting surfaces of the male members become worn the cone-like bearing between said members will tend to obviate any slack and the step shoulders 20 are additional provided to insure a radially normal pressure between said male and female members.

It will be apparent that the male and female members as independent units will possess sufficient resiliency without danger of rupture thereby, and alter installation will collectively possess sufficient rigidity to effect a leak proof operative connection between the piston and cylinder.

From the foregoing description taken in connection with the accompanying drawing, the advantages of the construction and of the method of operation will be readily apparent to those skilled in the principle of operation of the invention, together with the device which I now consider the best embodiment thereof. I desire to have it understood that the device shown is merely illustrative and that such changes may be made when desired as are within the scope of the invention.

What I claim is:

1. A piston ring comprising a male and female member, said male member adapted to seat within said female member, said male and female members having opposing convex walls diagonally arranged and divergently disposed upwardly from a substantially central point to form a wedge-like recess therebetween and step shoulders adapted to co-operatively form a radially normal bearing between said male and female members.

2. A piston ring comprising a male and female member, said male member adapted to seat within said female member, said male and female members having opposing walls diagonally arranged and divergently disposed upwardly from a substantially central point to form a wedge-like recess therebetween, the upward and outer portions of said male and female members being disposed to form a passageway to said wedge-like recess and step shoulders adapted to co-operatively form a radially normal bearing between said male and female members.

3. A piston ring comprising an outer and an inner ring member, said inner ring member being adapted to seat within said outer ring member and said ring members having opposing walls diagonally arranged and divergently disposed upwardly to form a wedge-like recess therebetween.

In witness whereof, I hereunto subscribe my name this 1st day of April, A. D. 1921.

ALFRED C. DE NISSON.